United States Patent
Yoshioka et al.

(10) Patent No.: US 9,887,396 B2
(45) Date of Patent: Feb. 6, 2018

(54) SURFACE-TREATED STEEL SHEET FOR BATTERY CONTAINERS, BATTERY CONTAINER, AND BATTERY

(71) Applicant: TOYO KOHAN CO., LTD., Tokyo (JP)

(72) Inventors: Koh Yoshioka, Yamaguchi (JP); Shinichirou Horie, Yamaguchi (JP); Kazuhiko Ishihara, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 15/011,331

(22) Filed: Jan. 29, 2016

(65) Prior Publication Data

US 2016/0211489 A1 Jul. 21, 2016

Related U.S. Application Data

(63) Continuation-in-part of application No. PCT/JP2014/061020, filed on Apr. 18, 2014.

(30) Foreign Application Priority Data

Jul. 31, 2013 (JP) ................................ 2013-158573

(51) Int. Cl.
*H01M 2/02* (2006.01)
*B32B 15/01* (2006.01)
(Continued)

(52) U.S. Cl.
CPC ......... *H01M 2/0292* (2013.01); *B32B 15/011* (2013.01); *C25D 3/12* (2013.01); (Continued)

(58) Field of Classification Search
CPC .............................. H01M 2/0287; H01M 2/022
See application file for complete search history.

(56) References Cited

U.S. PATENT DOCUMENTS 4,200,515 A * 4/1980 Hall ..................... C25B 11/0478
204/290.03
2009/0269661 A1* 10/2009 Mori .................... H01M 2/0202
429/166

FOREIGN PATENT DOCUMENTS

CN 101180748 A 5/2008
JP 6-346284 A 12/1994
(Continued)

OTHER PUBLICATIONS

An Office Action from corresponding JP Application No. 2013-158573 dated Aug. 1, 2017; 4 pgs with translation.
(Continued)

*Primary Examiner* — Olatunji Godo
(74) *Attorney, Agent, or Firm* — Muncy, Geissler, Olds & Lowe, P.C.

(57) ABSTRACT

Provided is a surface-treated steel sheet for battery containers (100) that is obtained in such a manner that after iron-nickel alloy plating is performed on a steel sheet (10), a thermal treatment is performed and is characterized in that an outermost layer is an iron-nickel alloy layer (20), and the iron-nickel alloy layer (20) has an average crystal size of 1 to 8 μm at the outermost surface thereof. The present invention makes it possible to provide the surface-treated steel sheet for battery containers that can suppress the elution of iron inside the battery when being used for a battery container, whereby the service life of the battery can be extended and battery characteristics such as discharge characteristics is improved, and to provide a battery container and a battery that can be obtained using the surface-treated steel sheet for battery containers.

3 Claims, 12 Drawing Sheets

(51) Int. Cl.
*C25D 3/12*   (2006.01)
*C25D 5/50*   (2006.01)
*C25D 7/00*   (2006.01)
*C25D 3/56*   (2006.01)
*C25D 7/06*   (2006.01)
C25D 5/36    (2006.01)

(52) U.S. Cl.
CPC ............... *C25D 3/562* (2013.01); *C25D 5/50* (2013.01); *C25D 7/00* (2013.01); *C25D 7/0614* (2013.01); *H01M 2/026* (2013.01); *H01M 2/0285* (2013.01); *H01M 2/0287* (2013.01); *H01M 2/0295* (2013.01); *C25D 5/36* (2013.01); *H01M 2220/30* (2013.01)

(56) References Cited

FOREIGN PATENT DOCUMENTS

| | | |
|---|---|---|
| JP | 10-212595 A | 8/1998 |
| JP | 2000-123797 A | 4/2000 |
| JP | 3429319 B2 | 5/2003 |

OTHER PUBLICATIONS

Office Action dated Oct. 11, 2017 in corresponding Chinese Application No. 201480043048.9 (w/English-language translation) 11 pages.

* cited by examiner

SURFACE-TREATED STEEL SHEET FOR BATTERY CONTAINERS, BATTERY CONTAINER, AND BATTERY

TECHNICAL FIELD

The present invention relates to a surface-treated steel sheet for battery containers, a battery container obtained by using the surface-treated steel sheet for battery containers, and a battery obtained using the battery container.

BACKGROUND ART

In recent years, alkaline batteries which are primary batteries and nickel hydrogen batteries and lithium-ion batteries which are secondary batteries are widely used as an operating power source for use in portable devices such as audio devices and mobile phones, which are used in various fields. These batteries are required to have a long service life, enhanced performance, or the like in accordance with the enhanced performance of the devices in which the batteries are equipped. A battery container, which is filled with electric power generating elements such as positive electrode active materials and negative electrode active materials, is also required to be improved in their performance as an important constitutional element of batteries.

An example of such a battery container is disclosed in Patent Document 1 in which after a nickel plating layer is formed on a steel sheet, an iron-nickel alloy plating layer is formed to be an inner surface of the battery container.

PRIOR ART DOCUMENT

Patent Document

[Patent Document 1] JP 2000-123797 A

SUMMARY OF INVENTION

Problems to be Solved by Invention

In a battery container disclosed in Patent Document 1, however, the surface of the iron-nickel alloy plating layer formed by iron-nickel alloy plating has many amorphous portions in which iron is easily eluted. In the case of using such a battery container for a battery container, iron is eluted from the amorphous portions in an electrolyte. Thus, the battery container is broken by a gas generated inside the battery with the elution of iron and liquid leakage occurs, whereby there is a problem that the service life of the battery is shortened.

An object of the invention is to provide a surface-treated steel sheet for battery containers that can suppress the elution of iron inside the battery when being used for a battery container, whereby the service life of the battery can be extended and battery characteristics such as discharge characteristics is improved. In addition, another object of the invention is also to provide a battery container and a battery that can be obtained using such a surface-treated steel sheet for battery containers.

Means for Solving Problems

As a result of intensive studies to achieve the above objects, the present inventors have found that the above objects can be achieved by performing a thermal treatment after iron-nickel alloy plating is performed on a steel sheet to have an average crystal grain size of 1 to 8 μm at the outermost surface of an iron-nickel alloy layer formed on the outermost surface, and accomplished the invention.

That is, according to the invention, there is provided a surface-treated steel sheet for battery containers obtained in such a manner that after iron-nickel alloy plating is performed on a steel sheet, a thermal treatment is performed. The surface-treated steel sheet for battery containers is characterized in that an outermost layer is an iron-nickel alloy layer, and the iron-nickel alloy layer has an average crystal size of 1 to 8 μm at the outermost surface thereof.

In the surface-treated steel sheet for battery containers of the invention, it is preferred that the content ratio of Fe atoms is 12 to 50 atomic % (at %) at the outermost surface of the iron-nickel alloy layer.

In the surface-treated steel sheet for battery containers of the invention, it is preferred that the iron-nickel alloy layer has Vickers hardness (HV) of 210 to 250.

According to the invention, there is provided a battery container obtained by a forming process of any one of the surface-treated steel sheets for battery containers.

In addition, according to the invention, there is provided a battery obtained using the battery container.

Effect of Invention

According to the invention, it is possible to provide a surface-treated steel sheet for battery containers that can suppress the elution of iron inside the battery when being used for a battery container, whereby the service life of the battery can be extended and battery characteristics such as discharge characteristics is improved, and to provide a battery container and a battery that can be obtained using the surface-treated steel sheet for battery containers.

MODE(S) FOR CARRYING OUT THE INVENTION

Embodiments of the invention will be described below with reference to the accompanying drawings.

First Embodiment

Figure 1:
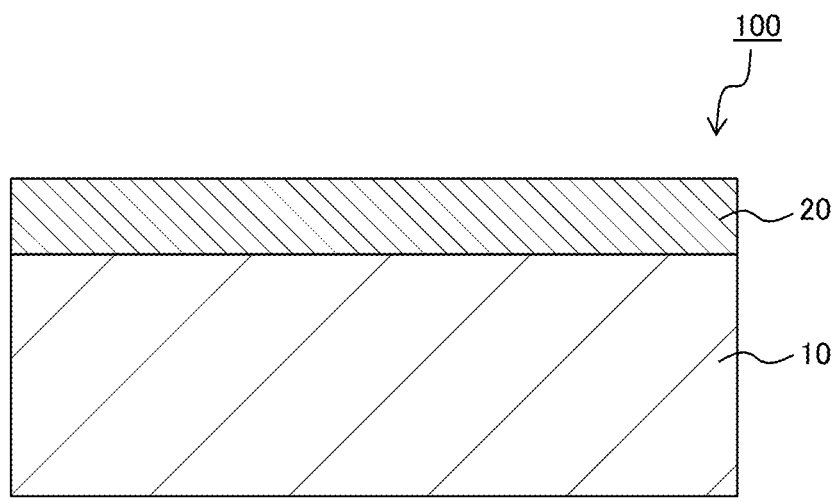
FIG. 1 is a configuration diagram of a surface-treated steel sheet for battery containers according to a first embodiment.

FIG. 1 is a diagram illustrating a configuration of a surface-treated steel sheet 100 according to this embodiment. As illustrated in FIG. 1, the surface-treated steel sheet 100 according to this embodiment is a surface-treated steel sheet for battery containers obtained in such a manner that after an iron-nickel alloy plating is performed on a steel sheet 10, an iron-nickel alloy layer 20 is formed by a thermal treatment such as continuous annealing or batch-type annealing.

<Steel Sheet 10>

The steel sheet 10 to be a base sheet for the surface-treated steel sheet 100 according to this embodiment is not particularly limited as long as it has excellent workability in drawing process, in drawing and ironing process, and in drawing-thin-redrawing (DTR) process. For example, steel sheets may be used, such as formed of low-carbon aluminum-killed steel (carbon amount of 0.01 to 0.15 wt %), extra-low-carbon steel having carbon amount of 0.003 wt % or less, or non-aging extra-low-carbon steel obtained by adding Ti or Nb to extra-low-carbon steel.

In this embodiment, a hot-rolled plate of the above steel is washed using acid to remove scale (oxide film) on the surface, and thereafter cold-rolled, followed by electrolytic cleaning of rolling oil, thereby to be used as the base sheet. Alternatively, one that is obtained by performing annealing and temper rolling after the above electrolytic cleaning is used as the base sheet. The annealing in this case may be any of continuous annealing and batch-type annealing, but is not particularly limited thereto.

<Iron-Nickel Alloy Layer 20>

As illustrated in FIG. 1, the iron-nickel alloy layer 20 is the outermost layer of the surface-treated steel sheet 100. The iron-nickel alloy layer 20 is formed in such a manner that after iron-nickel alloy plating is performed on the steel sheet 10, a thermal treatment such as continuous annealing or batch-type annealing is performed on the plated steel sheet 10. An average crystal grain size is controlled to be within the range of 1 to 8 μm at the outermost surface thereof.

In this embodiment, after the iron-nickel alloy plating is performed on the steel sheet 10, the thermal treatment is performed, so that the iron-nickel alloy layer 20 can be appropriately crystallized. Moreover, when the average crystal grain size is controlled to be within the above range at the outermost surface of the iron-nickel alloy layer 20, the iron-nickel alloy layer 20 has an appropriate degree of surface hardness, and the elution of iron into an electrolyte can be suppressed when using the resulting surface-treated steel sheet 100 as a battery container. In this embodiment, therefore, when the surface-treated steel sheet 100 is used as a battery container, the elution of iron into the electrolyte can be suppressed, so that it is possible to prevent breakage of the battery container caused by a gas generated with the elution of iron. Furthermore, it is also possible to achieve a long service life of the battery by improving the liquid leakage resistance of the battery container. Furthermore, in this embodiment, the iron-nickel alloy layer 20 has an appropriate degree of surface hardness, and thus when the surface-treated steel sheet 100 is formed for the battery container by a working process such as drawing, ironing, or DI or DTR forming such that the iron-nickel alloy layer 20 becomes the inside of the battery container, cracks of fine and shallow depth can occur on the surface of the iron-nickel alloy layer 20. Then, a contact area of the iron-nickel alloy layer 20 with a positive electrode mixture used for the battery can be increased by these cracks of fine and shallow depth, whereby internal resistance of the battery is lowered and battery characteristics such as discharge characteristics can be improved.

On the other hand, there are problems as follows when the thermal treatment is not performed. That is, with respect to a battery container obtained by a forming process of a steel sheet on which a thermal treatment is not performed after iron-nickel alloy plating is performed, there are problems that an iron is eluted into an electrolyte and a service life of a battery is shortened. It is considered that the reason of the elution of iron as described above is because distortion remains on a surface of a layer formed by the iron-nickel alloy plating, for example, in a state where the thermal treatment is not performed, and many amorphous portions are present due to such distortion, whereby the iron is easily eluted.

In addition, when the average crystal grain size is too small at the outermost surface of the iron-nickel alloy layer 20, the hardness of the iron-nickel alloy layer 20 becomes too high, deep cracks occur in the iron-nickel alloy layer 20 and extend to the steel sheet 10 during a forming process into the battery container, and thus the steel sheet 10 is exposed. In this case, the iron is eluted from the exposed portion of the steel sheet 10, the battery container is broken by a gas generated with the elution of iron, and liquid leakage resistance of the battery container is deteriorated. Alternatively, when the average crystal grain size is too large at the outermost surface of the iron-nickel alloy layer 20, the hardness of the iron-nickel alloy layer 20 becomes too small, and cracks do not suitably occur on an inner surface of the battery container during a forming process into the battery container. For this reason, it is not possible to sufficiently obtain an effect of lowering internal resistance of the battery and improving battery characteristics.

In this embodiment, the average crystal grain size can be measured at the outermost surface of the iron-nickel alloy layer 20 by the following method, for example. That is, when the iron-nickel alloy layer 20 is irradiated with electron beams using a scanning electron microscope (SEM), information on the crystal grain size is obtained for each of crystal grains constituting the iron-nickel alloy layer 20 by analysis of an electron backscatter diffraction (EBSD) pattern which is obtained by projection of electron beams reflected from the surface of the iron-nickel alloy layer 20 onto a screen, whereby the average crystal grain size can be calculated. Specifically, when a region in which the difference in reflection angle between adjacent irradiation points is within a predetermined range (for example, 2 to 15°) with respect to electron beams reflected from the surface of the iron-nickel alloy layer 20 is considered as one crystal grain, a crystal grain size can be measured for each crystal grain, the measured crystal grain sizes are averaged, and thus an average crystal grain size can be calculated.

In this embodiment, the average crystal grain size is 1 to 8 μm and preferably 2 to 8 μm at the outermost surface of the iron-nickel alloy layer 20. When the average crystal grain size is controlled to be within the above range at the outermost surface of the iron-nickel alloy layer 20, it is possible to improve liquid leakage resistance and battery characteristics in a case where the resulting surface-treated steel sheet 100 is used for the battery container as described above.

In the case of using the method of analyzing the electron backscatter diffraction (EBSD) pattern described above on the measurement of the average crystal grain size, the resulting measured value indicates the average crystal grain size at the outermost surface of the iron-nickel alloy layer 20. Meanwhile, it is considered in this embodiment that heat is also transferred to the inside of the iron-nickel alloy layer 20 by the thermal treatment described above and thus the inside thereof has been also properly crystallized. Thus, it is considered that the average crystal grain size is within the above range not only at the outermost surface of iron-nickel alloy layer 20 but also in the vicinity of the outermost surface.

In this embodiment, furthermore, the surface hardness of the iron-nickel alloy layer 20 is preferably 210 to 250, and more preferably 220 to 240 in terms of Vickers hardness (HV). When the surface hardness of the iron-nickel alloy layer 20 is too high in terms of Vickers hardness, deep cracks occur in the iron-nickel alloy layer 20 during a forming process into the battery container, and thus the steel sheet 10 is exposed. For this reason, when the iron-nickel alloy layer 20 is used for the battery container, the iron is eluted from the exposed portion of the steel sheet 10, and liquid leakage resistance of the battery container is deteriorated. Meanwhile, when the surface hardness of the iron-nickel alloy layer 20 is too low in terms of Vickers hardness, cracks do not suitably occur on an inner surface of the battery container during a forming process into the battery container. For this reason, and thus it is not possible to sufficiently obtain an effect of lowering internal resistance of the battery and improving battery characteristics.

The thickness of the iron-nickel alloy layer 20 is not particularly limited, but is preferably 0.5 to 3.0 μm and more preferably 1.0 to 2.0 μm. When the thickness of the iron-nickel alloy layer 20 is set to be within the above range, it is possible to further improve liquid leakage resistance and battery characteristics of the battery container in a case where the resulting surface-treated steel sheet 100 is used for the battery container.

The thickness of the iron-nickel alloy layer 20 can be measured using the following method, for example. That is, the transition of Ni intensity may be measured using a high-frequency glow discharge optical emission spectrometer in a depth direction of the iron-nickel alloy layer 20 with respect to the surface-treated steel sheet 100 to detect a depth at which no nickel exists, from the start of measurement, and the thickness of the iron-nickel alloy layer 20 can thus be determined.

In this embodiment, when the Ni intensity is measured for the surface-treated steel sheet 100, a nickel existing region is defined by a region in which the Ni intensity is 1/10 or more of the maximum value thereof on the basis of the maximum value of the Ni intensity. Accordingly, in this embodiment, while the Ni intensity is measured in the depth direction of the surface-treated steel sheet 100, the measurement time may be calculated from the starting time of measurement to a time at which the Ni intensity becomes less than 1/10 of the maximum value of the Ni intensity. The thickness of the iron-nickel alloy layer 20 can be determined on the basis of the calculated measurement time.

Figure 2:
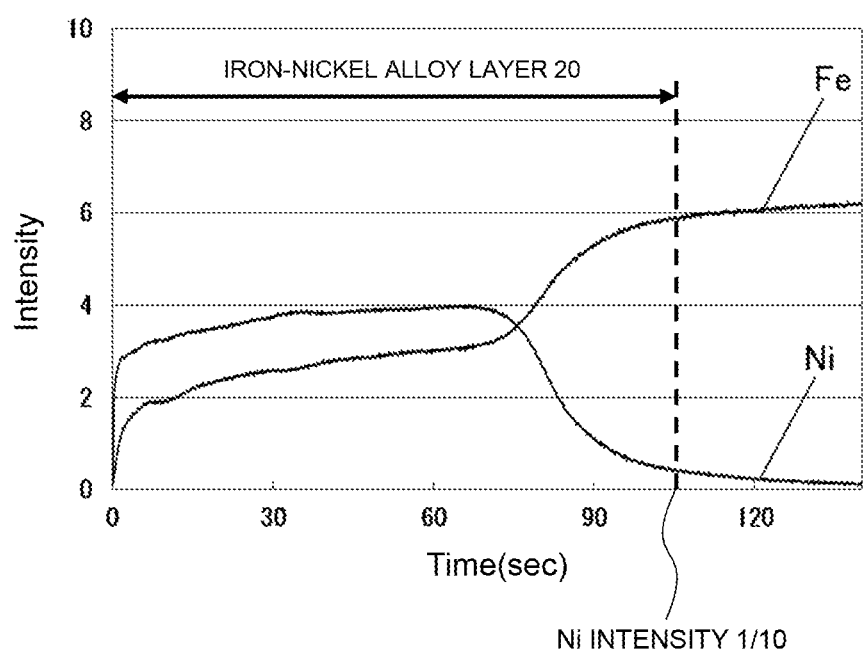
FIG. 2 is a diagram illustrating results obtained by measuring Ni intensity and Fe intensity with respect to the surface-treated steel sheet for battery containers according to the first embodiment, using a high-frequency glow discharge optical emission spectrometer.

Here, FIG. 2 is a graph illustrating results obtained by measuring the transition of Ni intensity and Fe intensity in the depth direction of the iron-nickel alloy layer 20 with respect to the surface-treated steel sheet 100 using a high-frequency glow discharge optical emission spectrometer. In FIG. 2, a horizontal axis represents a measurement time by the high-frequency glow discharge optical emission spectrometer, and a vertical axis represents the Ni intensity or the Fe intensity which is measured. For example, in the graph illustrated in FIG. 2, the Ni intensity has the maximum value at a time of about 70 seconds, and a time of about 105 seconds from the starting time of measurement can be calculated as a time at which the Ni intensity becomes less than 1/10 of the maximum value (in FIG. 2, a time indicated by "Ni intensity 1/10"). Based on the measurement time for about 105 seconds calculated in this way, the thickness of the iron-nickel alloy layer 20 can be determined.

<Method of Manufacturing the Surface-Treated Steel Sheet 100>

Next, the description is made on a method of manufacturing the surface-treated steel sheet 100 according to this embodiment.

First, a steel sheet is prepared to constitute the steel sheet 10, and iron-nickel alloy plating is performed on the steel sheet 10. The iron-nickel alloy plating can be performed by, for example, an electroplating method or an electroless plating method. However, the iron-nickel alloy plating is preferably performed by the electroplating method in view of the fact that the average crystal grain size of the resulting iron-nickel alloy layer 20 is easily controlled.

For example, in the case of performing the iron-nickel alloy plating by the electroplating method, the plating is performed on the steel sheet 10 using a plating bath (iron-nickel plating bath) contained with a buffer agent and the like in addition to an iron salt and a nickel salt that constitute the iron-nickel alloy layer 20. A specific example of the iron-nickel includes a watt bath or a sulfamate salt as a base and may include a plating bath added with an iron salt such as iron sulfate, a nickel salt such as nickel sulfate or nickel chloride, and a buffer agent such as boric acid or citric acid.

The iron salt and the nickel salt to be contained in the iron-nickel plating bath are not particularly limited. An example of the iron salt preferably includes iron sulfate, iron chloride, iron sulfamate, or ferric citrate, and an example of the nickel salt preferably includes nickel sulfate, nickel chloride, nickel carbonate, nickel acetate, nickel sulfamate, or nickel methansulfonate. In order that the surface of the iron-nickel alloy layer 20 to be formed has Vickers hardness within the above range, in this embodiment, it is preferable that the iron salt and the nickel salt do not substantially contain metals other than iron and nickel. However, the iron salt and the nickel salt may contain other metals as mere impurities.

In this embodiment, with respect to a layer formed by the iron-nickel alloy plating, the content ratio of Fe atoms and Ni atoms is not particularly limited. However, the content ratio of Fe atoms is preferably 15 to 45 atomic %, and more preferably 20 to 40 atomic %. In addition, the content ratio of Ni atoms is preferably 55 to 85 atomic %, and more preferably 60 to 80 atomic %. When the content ratio of Fe atoms and Ni atoms is within the above range, it is possible to control the average crystal grain size at the outermost surface of the resulting iron-nickel alloy layer 20 to be within the range described above. The content ratio of these Fe atoms and Ni atoms can be controlled by appropriate adjustment of the composition of the iron-nickel plating bath. When the content ratio of Fe atoms is too large (that is, when the content ratio of Ni atoms is too small), the average crystal grain size becomes too small at the outermost surface of the iron-nickel alloy layer 20. On the other hand, when the content ratio of Fe atoms is too small (that is, when the content ratio of Ni atoms is too large), the average crystal grain size becomes too large at the outermost surface of the iron-nickel alloy layer 20.

In addition, pH of the iron-nickel plating bath is preferably 1.0 to 3.0, and more preferably 1.5 to 2.9. When the pH of the iron-nickel plating bath is within the above range, it is possible to prevent occurrence of ferrous sludge (sediment) in the iron-nickel plating bath. Thus, the sludge can be prevented from being adhered onto the steel sheet 10, and the concentration of iron ions in the iron-nickel plating bath can be appropriately further managed, so that the iron-nickel alloy plating can be performed in excellent fashion.

Moreover, a temperature of the iron-nickel plating bath is preferably 40 to 80° C., and more preferably 50 to 70° C. Furthermore, when the electroplating is performed by the iron-nickel plating bath, current density is preferably 5 to 40 $A/dm^2$, and more preferably 5 to 30 $A/dm^2$. When the temperature of the iron-nickel plating bath and the current density are within the above range at the time of performing the electroplating, it is possible to perform the iron-nickel alloy plating in excellent fashion.

Subsequently, in this embodiment, a thermal treatment is performed on the steel sheet 10 on which the iron-nickel alloy plating is performed. Thus, the layer is formed on the steel sheet 10 by the iron-nickel alloy plating and is thermally diffused, so that the iron-nickel alloy layer 20 is formed. A thermal treatment method is not particularly limited, but, for example, a continuous annealing method or a batch-type annealing method may be used. In the case of performing the thermal treatment by the continuous annealing method, it is preferable that a thermal treatment temperature is 700 to 800° C. and a thermal treatment time is 10 seconds to 300 seconds. Furthermore, in the case of performing the thermal treatment by the batch-type annealing method, it is preferable that a thermal treatment temperature is 450 to 650° C., a thermal treatment time is 1 hour to 10 hours, and a thermal treatment atmosphere is a non-oxidizing atmosphere or a reducing protection gas atmosphere. When the thermal treatment atmosphere is the reducing protection gas atmosphere, a protection gas may preferably be used which consists of 75% hydrogen-25% nitrogen with high heat transfer and which is generated by an ammonia crack method referred to as hydrogen enriched annealing.

Here, it is possible to control the average crystal grain size at the outermost surface of the iron-nickel alloy layer 20 by appropriate adjustment of conditions of the thermal treatment temperature or the thermal treatment time at the time of performing the thermal treatment. Specifically, the average crystal grain size can become larger as the thermal treatment temperature becomes higher or the thermal treatment time becomes longer. Meanwhile, the average crystal grain size can become smaller as the thermal treatment temperature becomes lower or the thermal treatment time becomes shorter.

In this embodiment, the iron-nickel alloy layer 20 can be appropriately crystallized as described above by performance of the thermal treatment, and thus the surface-treated steel sheet 100 is obtained. In the battery container obtained by the forming process of the surface-treated steel sheet 100, the elution of iron into the electrolyte can be effectively suppressed. Whereas, in the case of not performing the thermal treatment, the resulting surface-treated steel sheet has the outermost surface in which an amorphous portion becomes much. Moreover, when such a surface-treated steel sheet is used for the battery container, the iron is easily eluted into the electrolyte from these amorphous portions. Particularly, in the case of not performing the thermal treatment, since the orientation of crystal grains is distorted at the surface, electron beams to be irradiated on the surface deviates from each other in reflection angle even when the average crystal grain size is measured by the electron backscatter diffraction (EBSD) pattern or the like. In this case, moreover, the electron backscatter diffraction (EBSD) pattern is not obtained, and it is assumed that the average crystal grain size cannot be calculated. Meanwhile, in this embodiment, the thermal treatment is performed after the iron-nickel alloy plating is performed, and thus such distortion is eliminated. Moreover, the surface of the iron-nickel alloy layer 20 to be formed is appropriately crystallized, and thus the elution of iron can be effectively suppressed.

In the iron-nickel alloy layer 20, the content ratio of Fe atoms and Ni atoms is not particularly limited. In the outermost surface, however, the content ratio of Fe atoms is preferably 12 to 50 atomic %, more preferably 15 to 45 atomic %, and further more preferably 20 to 40 atomic %. When the content ratio of Fe atoms is within the above range, it is possible to control the average crystal grain size at the outermost surface of the iron-nickel alloy layer 20 to be within the range described above. Here, as a method of controlling the content ratio of Fe atoms in the outermost surface of the iron-nickel alloy layer 20 to be within the above range, for example, there is a method of adjusting the content ratio of iron salt and nickel salt contained in the iron-nickel plating bath described above. In addition, as a method of measuring a ratio of Fe atoms contained in the iron-nickel alloy layer 20, for example, there is a method of measuring a ratio of Fe atoms in the outermost surface using a scanning-type Auger electron spectrometer.

As described above, the surface-treated steel sheet 100 according to this embodiment is manufactured.

According to the surface-treated steel sheet 100 of this embodiment, as described above, the thermal treatment is performed after the iron-nickel alloy plating is performed on the steel sheet 10, and thus the iron-nickel alloy layer 20 can be appropriately crystallized. Moreover, the average crystal grain is controlled to be within the above range at the outermost surface of the iron-nickel alloy layer 20, and thus liquid leakage resistance and battery characteristics can be improved when the resulting surface-treated steel sheet 100 is used for the battery container.

<Battery Container>

A battery container of this embodiment can be obtained by forming of the surface-treated steel sheet 100 described above. Specifically, the battery container can be obtained by forming of the above-described surface-treated steel sheet 100 into a battery container shape through drawing, ironing, or DI or DTR forming. In this case, the surface-treated steel sheet 100 is formed such that the iron-nickel alloy layer 20 becomes the inside of the battery container.

Since the battery container obtained in this way is obtained using the surface-treated steel sheet 100 described above, battery characteristics such as liquid leakage resistance and discharge characteristics are improved. Thus, the service life of the battery increases and battery characteristics such as discharge characteristics are also excellent. Therefore, the battery container can be suitably used as a battery container of, for example, an alkaline battery, a battery such as a nickel-hydrogen battery using an alkaline electrolyte, or a lithium-ion battery.

Figure 10:
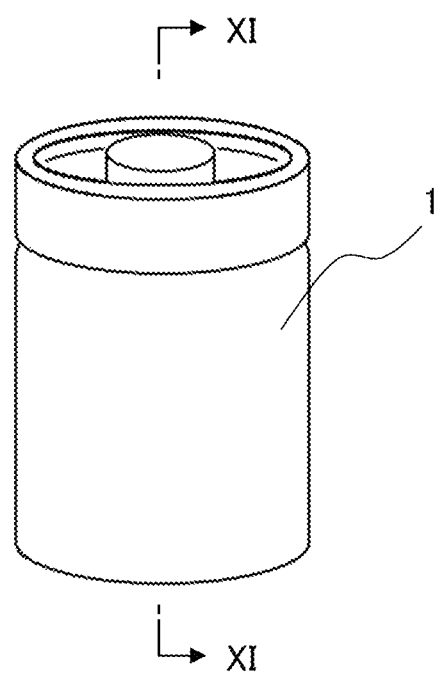
FIG. 10 is a perspective view of an embodiment of the lithium-ion battery using the battery container which is made of the surface-treated steel sheet according to the present invention.
Figure 11:
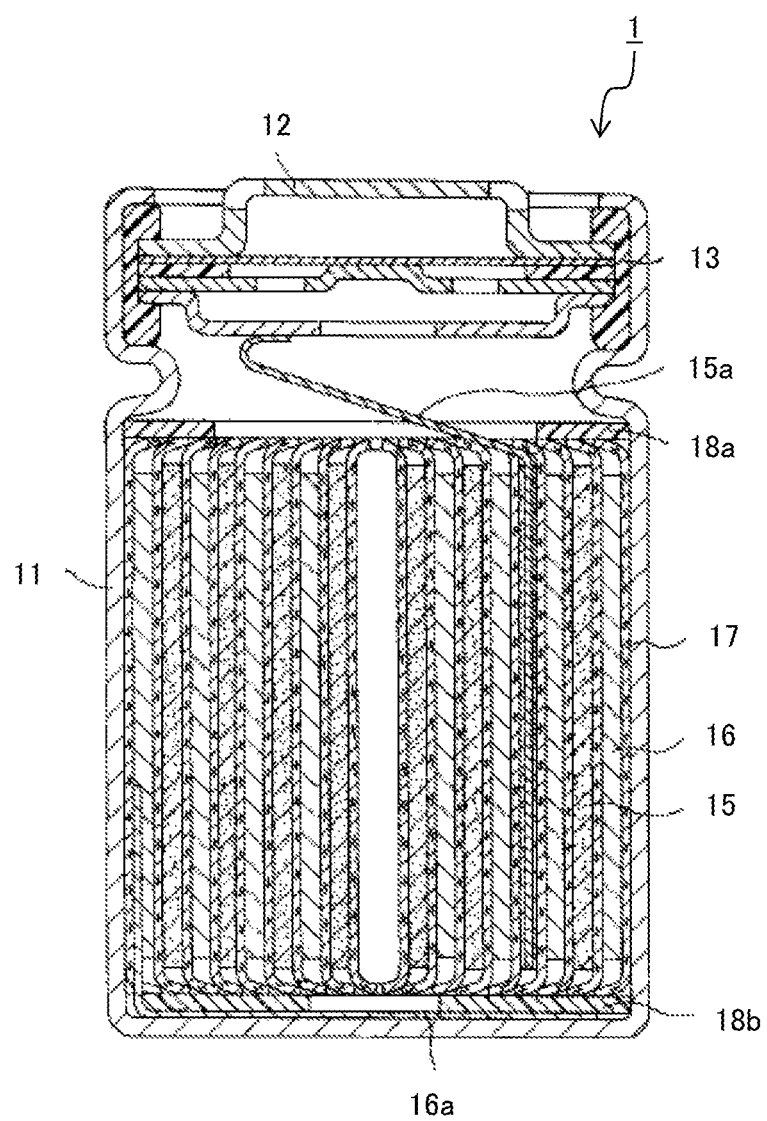
FIG. 11 is a sectional view along the line XI-XI in FIG. 10.

Incidentally, an embodiment of the lithium-ion battery 1 using the battery container (a battery can 11) which is made of the surface-treated steel sheet 100 according to the present invention will be described. FIG. 10 is a perspective view of an embodiment of a lithium-ion battery 1. FIG. 11 is a sectional view of a lithium-ion battery 1. A battery can 11 accommodates battery elements (electric power generating elements) including a nonaqueous electrolytic solution. The battery elements consists of a positive electrode plate 15, a negative electrode plate 16, and a separator 17 interposed between the positive and negative electrode plates, the electrode plate group being spirally rolled up a plurality of turns. The opening end of the battery can 11 is sealed by a sealing plate 12, which is equipped with a safety valve and also serves as a positive electrode terminal. The battery can 11 is electrically insulated from the sealing plate 12 by an insulating packing 13. A positive electrode lead 15a, which is attached to the positive electrode plate 15, is electrically connected to the sealing plate 12. A negative electrode lead 16a, which is attached to the negative electrode plate 16, is electrically connected to the inner face of the bottom of the battery can 11. Insulating rings 18a and 18b are fitted to the upper and lower parts of the electrode plate group, respectively.

Second Embodiment

Next, a second embodiment of the invention will be described.

Figure 3:
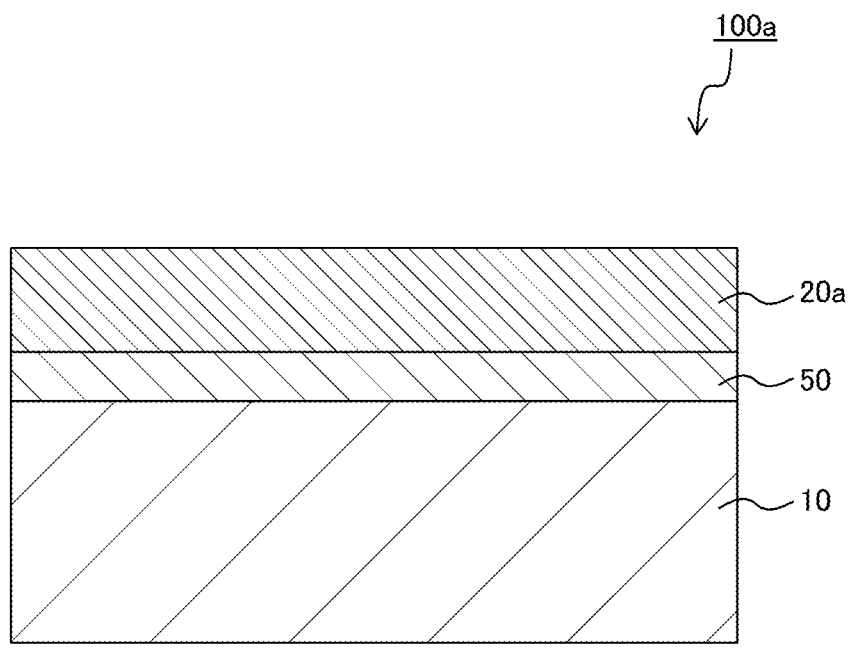
FIG. 3 is a configuration diagram of a surface-treated steel sheet for battery containers according to a second embodiment.

A surface-treated steel sheet 100a according to a second embodiment has a configuration as illustrated in FIG. 3, and has the same configuration as the surface-treated steel sheet 100 according to the first embodiment except that an iron-nickel diffusion layer 50 is provided between an iron-nickel alloy layer 20a and a steel sheet 10.

Figure 4:
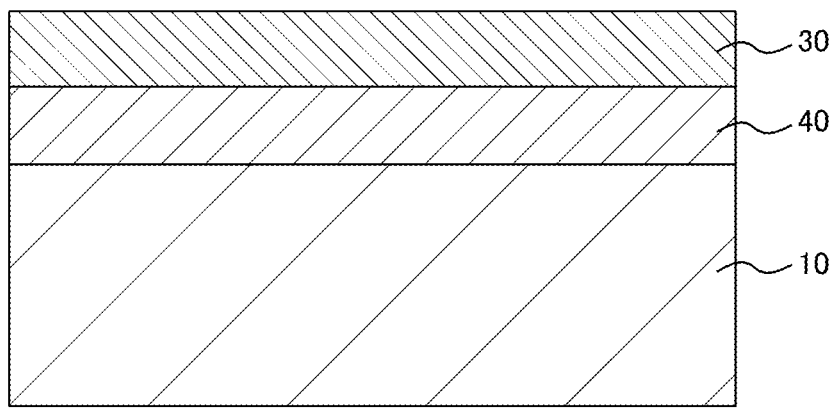
FIG. 4 is a diagram for describing a method of manufacturing the surface-treated steel sheet for battery containers according to the second embodiment.

Unlike the surface-treated steel sheet 100 according to the first embodiment described above, the surface-treated steel sheet 100a according to the second embodiment is manufactured by the following method. That is, first, a nickel plating layer 40 and an iron-nickel alloy plating layer 30 are formed on a steel sheet 10 in this order, whereby a surface-treated steel sheet is obtained as illustrated in FIG. 4. Subsequently, a thermal treatment is performed on the surface-treated steel sheet illustrated in FIG. 4 so that each layer is thermally diffused, and thus the iron-nickel alloy layer 20a and the iron-nickel diffusion layer 50 are formed. As a result, the surface-treated steel sheet 100a is manufactured.

Here, the iron-nickel alloy plating layer 30 can be formed on the steel sheet 10 by plating under the same conditions as the iron-nickel alloy plating in the first embodiment described above. In addition, the nickel plating layer 40 can be formed on the steel sheet 10 by a known method using a watt bath, a sulfamate bath, or the like.

In this embodiment, the thermal treatment is performed on the surface-treated steel sheet illustrated in FIG. 4 so that each layer is thermally diffused, and thus the iron-nickel alloy layer 20a and the iron-nickel diffusion layer 50 are formed. In this case, however, the iron-nickel alloy layer 20a is formed by thermal diffusion of the nickel plating layer 40 and the iron-nickel alloy plating layer 30, and the iron-nickel diffusion layer 50 is formed by thermal diffusion of the steel sheet 10 and the nickel plating layer 40. Here, when the iron-nickel alloy layer 20a and the iron-nickel diffusion layer 50 are formed, the nickel plating layer 40 is completely diffused by the thermal treatment such that the nickel plating layer 40 does not remain alone in the resulting surface-treated steel sheet 100a as illustrated in FIG. 3.

Conditions of the thermal treatment may be similar to those of the thermal treatment in the first embodiment described above without being particularly limited. However, the conditions are set such that the nickel plating layer 40 does not remain alone by adjustment of the thermal treatment temperature and the thermal treatment time.

In this embodiment, the thickness of the nickel plating layer 40 is preferably 1.5 μm or less and more preferably 1.0 μm or less before the thermal treatment is performed. When the thickness of the nickel plating layer 40 exceeds 1.5 μm before the thermal treatment is performed, it may be required to perform the thermal treatment at a high temperature for a long time so as to completely diffuse the nickel plating layer, and thus the steel sheet may be deteriorated by heat in some cases. When the thickness of the nickel plating layer 40 is 1.5 μm or less before the thermal treatment is performed, it is possible to suppress deterioration of the steel sheet due to heat. Moreover, in the case of 1.0 μm or less, since the nickel plating layer 40 can be completely diffused by the thermal treatment under a lower thermal treatment temperature or a shorter thermal treatment time, it is possible to prevent deterioration of the steel sheet 10 due to heat.

Furthermore, in this embodiment, the outermost surface of the iron-nickel alloy layer 20a has an average crystal grain size similar to that of the iron-nickel alloy layer 20 of the surface-treated steel sheet 100 according to the first embodiment described above. A method of controlling the average crystal grain size at the outermost surface of the iron-nickel alloy layer 20a is not particularly limited, but, for example, may include a method of performing the iron-nickel alloy plating or a method of performing the thermal treatment under the same conditions as in the first embodiment described above.

Moreover, in this embodiment, the iron-nickel alloy layer 20a also has the same hardness as that of the iron-nickel alloy layer 20 of the surface-treated steel sheet 100 according to the first embodiment described above.

The thickness of the iron-nickel alloy layer 20a is not particularly limited, but is preferably 0.1 to 1.0 μm and more preferably 0.1 to 0.5 μm. When the thickness of the iron-nickel alloy layer 20a is set to be within the above range, liquid leakage resistance and battery characteristics are further improved in a case where the resulting surface-treated steel sheet 100a is used for the battery container.

In this embodiment, the thickness of the iron-nickel alloy layer 20a can be measured by, for example, the following method in the surface-treated steel sheet 100a. That is, when the transition of Ni intensity is measured using a high-frequency glow discharge optical emission spectrometer in a depth direction of the iron-nickel alloy layer 20a with respect to the surface-treated steel sheet 100a, the thickness of the iron-nickel alloy layer 20a can thus be detected as a depth obtained up to a time at which Ni intensity becomes the maximum value from the start of measurement.

Figure 5:
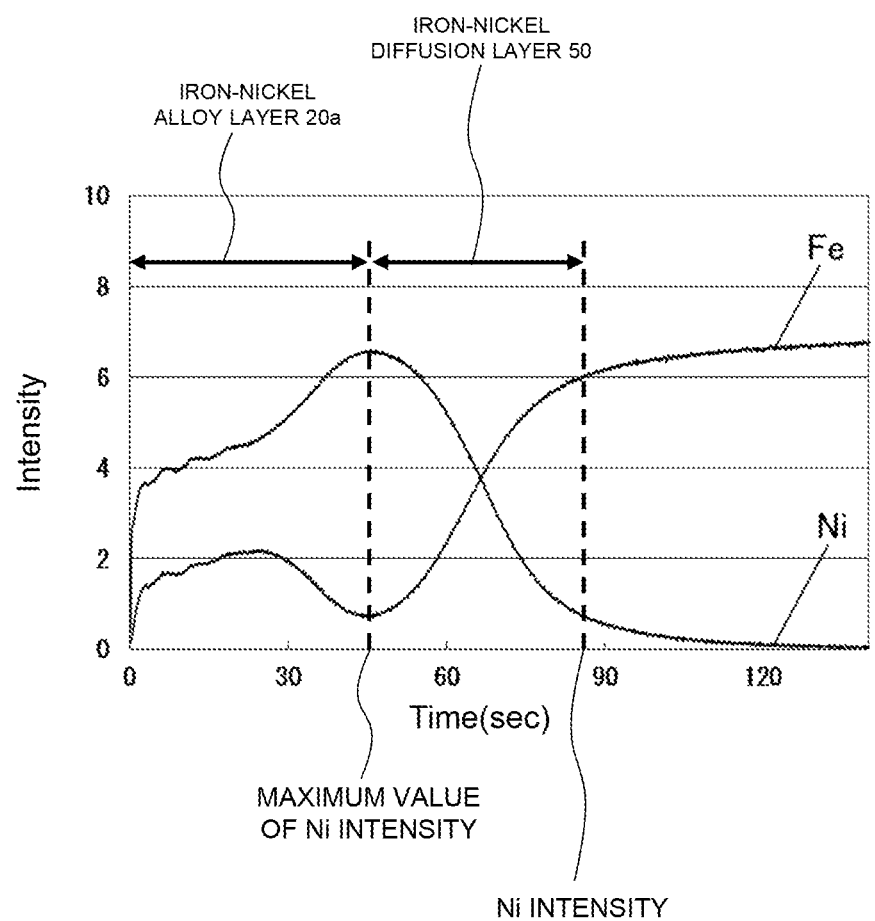
FIG. 5 is a diagram illustrating results obtained by measuring Ni intensity and Fe intensity with respect to the surface-treated steel sheet for battery containers according to the second embodiment, using a high-frequency glow discharge optical emission spectrometer.

Here, FIG. 5 is a graph illustrating results obtained by measuring the transition of Ni intensity and Fe intensity in the depth direction of the iron-nickel alloy layer 20a with respect to the surface-treated steel sheet 100a using a high-frequency glow discharge optical emission spectrometer. In FIG. 5, a horizontal axis represents a measurement time by the high-frequency glow discharge optical emission spectrometer, and a vertical axis represents the Ni intensity or the Fe intensity which is measured. For example, in the graph illustrated in FIG. 5, a time of about 45 seconds from the starting time of measurement can be calculated as a time at which the Ni intensity becomes the maximum value (in FIG. 5, a time indicated by the "maximum value of Ni intensity"). Based on the measurement time for about 45 seconds calculated in this way, the thickness of the iron-nickel alloy layer 20*a* can be determined.

In this embodiment, since the iron-nickel alloy layer 20*a* is formed by the thermal diffusion of the iron-nickel alloy plating layer 30 and the nickel plating layer 40, the thickness of the iron-nickel alloy layer 20*a* is thicker than that of the iron-nickel alloy plating layer 30 in general.

Furthermore, the thickness of the iron-nickel diffusion layer 50 is not particularly limited in this embodiment. However, the thickness of the iron-nickel diffusion layer 50 can be also measured using the high-frequency glow discharge optical emission spectrometer in the same manner as in the measurement of the thickness of the iron-nickel alloy layer 20*a*. That is, the transition of Ni intensity can be measured using the high-frequency glow discharge optical emission spectrometer in a depth direction with respect to the surface-treated steel sheet 100*a*, and the thickness of the iron-nickel diffusion layer 50 can be detected as a depth obtained up to a time at which the Ni intensity becomes less than $1/10$ of the maximum value, from the time at which the Ni intensity becomes the maximum value.

In the graph illustrated in FIG. 5, for example, as described above, the thickness of the iron-nickel alloy layer 20*a* is defined as the depth obtained up to a time of about 45 seconds at which the Ni intensity becomes the maximum value, from the start of measurement. Moreover, the thickness of the iron-nickel diffusion layer 50 is defined as the depth obtained up to the time of about 85 seconds at which the Ni intensity becomes less than $1/10$ of the maximum value (in FIG. 5, a time indicated by "Ni intensity $1/10$"), from the time of about 45 seconds at which the Ni intensity becomes the maximum value. In this case, the thickness of the iron-nickel diffusion layer 50 can be determined based on the measurement time for about 40 seconds from the time of about 45 seconds to the time of about 85 seconds.

In this embodiment, as illustrated in FIG. 3, the thermal diffusion is performed on the steel sheet 10 after the nickel plating layer 40 and the iron-nickel alloy plating layer 30 are formed on the steel sheet 10, and the outermost surface of the iron-nickel alloy layer 20*a* to be formed has the same average crystal grain size as in the first embodiment described above. Thus, similarly to the surface-treated steel sheet 100 according to the first embodiment described above, liquid leakage resistance and battery characteristics can be improved in a case where the resulting surface-treated steel sheet 100*a* is used for the battery container.

Figure 6:
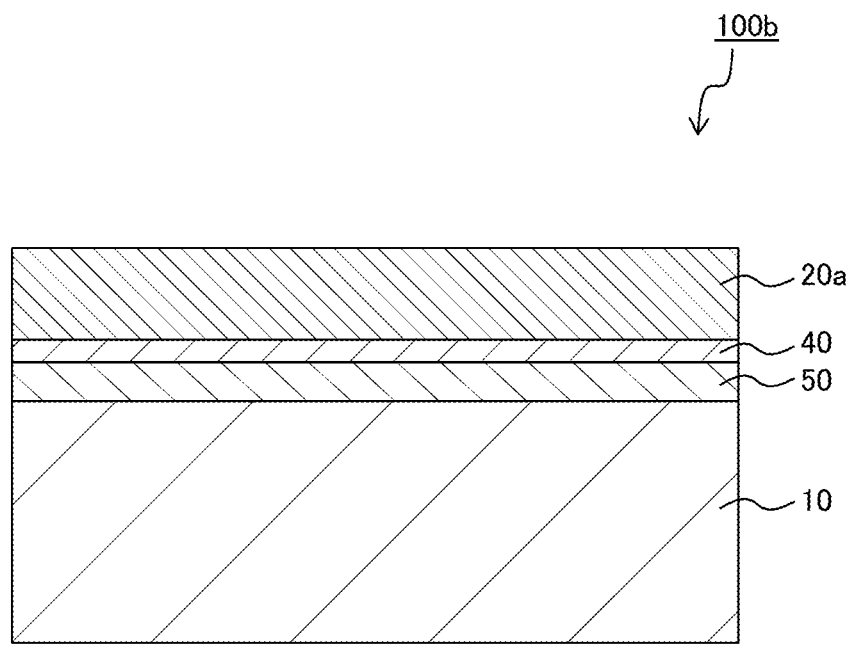
FIG. 6 is a configuration diagram illustrating another example of the surface-treated steel sheet for battery containers according to the second embodiment.

In this embodiment, similarly to a surface-treated steel sheet 100*b* illustrated in FIG. 6, the nickel plating layer 40 may be configured to remain alone between the iron-nickel alloy layer 20*a* and the iron-nickel diffusion layer 50 by appropriate adjustment of the thickness of the nickel plating layer 40 before the thermal treatment or conditions of the thermal treatment.

In such a surface-treated steel sheet 100*b*, the thickness of the iron-nickel alloy layer 20*a* can be measured using the following method, for example. That is, the transition of Fe intensity may be measured using a high-frequency glow discharge optical emission spectrometer in a depth direction of the iron-nickel alloy layer 20*a* with respect to the surface-treated steel sheet 100*b* to detect a depth up to a time at which no iron exists, from the start of measurement, and the thickness of the iron-nickel alloy layer 20*a* can thus be determined.

In this embodiment, when the Fe intensity is measured for the surface-treated steel sheet 100*b*, an iron existing region is defined as a region in which the Fe intensity is $1/10$ or more of the maximum value of the Fe intensity. Accordingly, in this embodiment, while the Fe intensity is measured in the depth direction of the surface-treated steel sheet 100*b*, the measurement time may be first calculated from the starting time of measurement to a time at which the Fe intensity becomes less than $1/10$ of the maximum value. The thickness of the iron-nickel alloy layer 20*a* can be determined on the basis of the calculated measurement time. The maximum value of the Fe intensity represents Fe intensity when no variation of Fe intensity and Ni intensity occur while the measurement is performed using the high-frequency glow discharge optical emission spectrometer up to the steel sheet 10 in the depth direction of the surface-treated steel sheet 100*b*.

Figure 7:
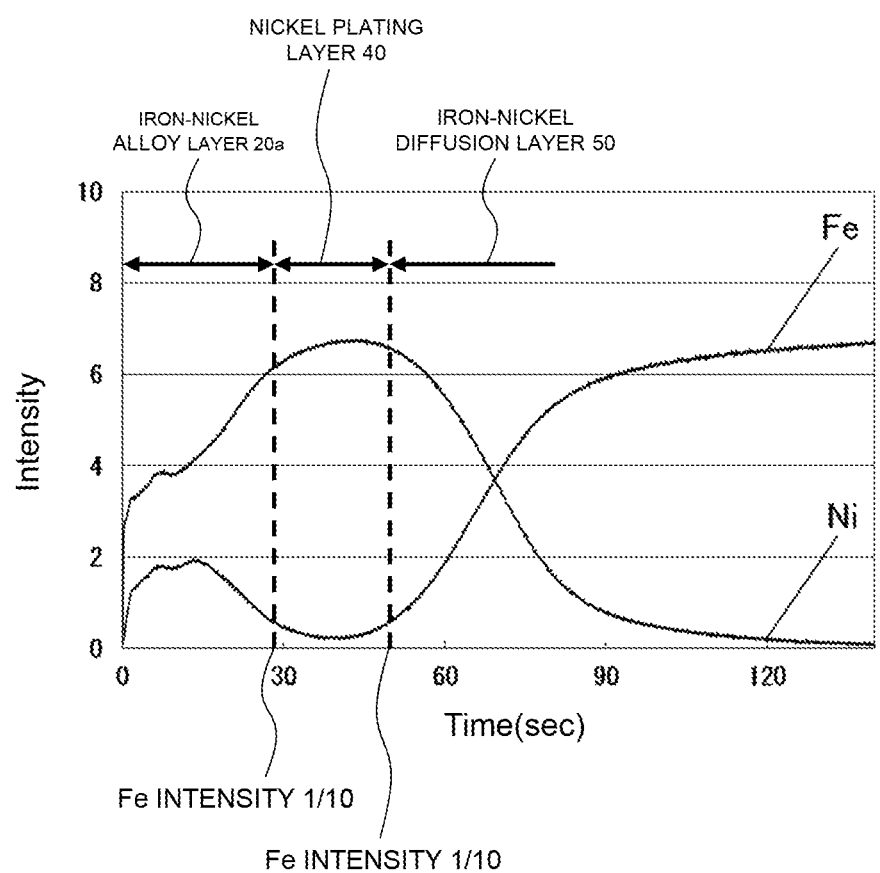
FIG. 7 is a diagram illustrating results obtained by measuring Ni intensity and Fe intensity with respect to another example of the surface-treated steel sheet for battery containers according to the second embodiment, using a high-frequency glow discharge optical emission spectrometer.

Here, FIG. 7 is a graph illustrating results obtained by measuring the transition of Ni intensity and Fe intensity using a high-frequency glow discharge optical emission spectrometer in the depth direction of the iron-nickel alloy layer 20*a* with respect to the surface-treated steel sheet 100*b*. In FIG. 7, a horizontal axis represents a measurement time by the high-frequency glow discharge optical emission spectrometer, and a vertical axis represents the Ni intensity or the Fe intensity which is measured. For example, in the graph illustrated in FIG. 7, a time of about 28 seconds can be first calculated as a time at which the Fe intensity becomes less than $1/10$ of the maximum value (in FIG. 7, a time indicated by "Fe intensity $1/10$") from the starting time of measurement. Based on the measurement time for about 28 seconds calculated in this way, the thickness of the iron-nickel alloy layer 20*a* can be determined.

In addition, the thickness of the nickel plating layer 40 can be also measured with respect to the surface-treated steel sheet 100*b* using the high-frequency glow discharge optical emission spectrometer. That is, the transition of the Fe intensity is measured in the depth direction of the surface-treated steel sheet 100*b* using the high-frequency glow discharge optical emission spectrometer, and thus the thickness of the nickel plating layer 40 can be detected as a region in which the Fe intensity becomes less than $1/10$ of the maximum value.

In the graph illustrated in FIG. 7, for example, as described above, the thickness of the iron-nickel alloy layer 20*a* is first defined as the depth obtained up to a time of about 28 seconds at which the Fe intensity becomes less than $1/10$ of the maximum value, from the start of measurement. Moreover, the thickness of the nickel plating layer 40 is defined as the depth obtained up to the time of about 50 seconds at which the Fe intensity increases up to $1/10$ or more than the maximum value after the Fe intensity decreases (in FIG. 7, a time indicated by "Fe intensity $1/10$"), from the time of about 28 seconds at which the Fe intensity becomes less than $1/10$ of the maximum value. In this case, the thickness of the nickel plating layer 40 can be determined on the based on the measurement time for about 22 seconds from the time of about 28 seconds to the time of about 55 seconds. In the surface-treated steel sheet 100*b*, as illustrated in FIG. 7, the iron-nickel diffusion layer 50 also exists in a portion deeper than the depth obtained at the time of about 50 seconds at which the Fe intensity becomes $1/10$ or more of the maximum value.

However, during the forming of the surface-treated steel sheet 100b, in which the nickel plating layer 40 remains, into a battery container, cracks occurs inside the battery container and the cracks reach the steel sheet 10, whereby if the steel sheet 10, the nickel plating layer 40, and the iron-nickel diffusion layer 50 are in a state of being exposed, there is a concern that the steel sheet 10 is easily eluted into the electrolyte. That is, in a case where the nickel plating layer 40 remains, due to the difference in standard electrode potential of iron in the steel sheet 10 and nickel in the nickel plating layer 40, a battery is formed by the steel sheet 10 and the nickel plating layer 40 in an electrolyte, and the iron is eluted from the steel sheet 10. Consequently, the iron is diffused into the electrolyte, and thus it is concern that the elution of the steel sheet 10 proceeds in sequence.

In contrast, the surface-treated steel sheet 100a illustrated in FIG. 3 has a configuration in which the nickel plating layer 40 does not remain, and thus it is possible to more effectively prevent the elution of the steel sheet 10 as compared with the above-described configuration illustrated in FIG. 6. Therefore, it is preferred that this embodiment has the configuration in which the nickel plating layer 40 does not remain as illustrated in FIG. 3.

Here, an example of a method of confirming whether the nickel plating layer 40 remains in the surface-treated steel sheet 100a may include a method of measuring Fe intensity using a high-frequency glow discharge optical emission spectrometer. That is, it is determined that the nickel plating layer 40 remains in a case where a region exists in which the Fe intensity is less than 1/10 of the maximum value of the Fe intensity when the transition of Fe intensity is measured using the high-frequency glow discharge optical emission spectrometer in a thickness direction toward the steel sheet 10 from the iron-nickel alloy layer 20a at the outermost surface, and it can be determined that the nickel plating layer 40 does not remain in a case where a region does not exist in which the Fe intensity is less than 1/10 of the maximum value.

Specifically, as illustrated in FIGS. 6 and 7, since the region exists in the surface-treated steel sheet 100b in which the Fe intensity is less than 1/10 of the maximum value (in FIG. 7, a region from about 28 seconds to about 50 seconds), it can be determined that the nickel plating layer 40 remains. In addition, as illustrated in FIGS. 3 and 5, the region does not exist in the surface-treated steel sheet 100a in which the Fe intensity is less than 1/10 of the maximum value, and thus it can be determined that the nickel plating layer 40 does not remain.

Third Embodiment

A third embodiment of the invention will be described below.

Figure 8:
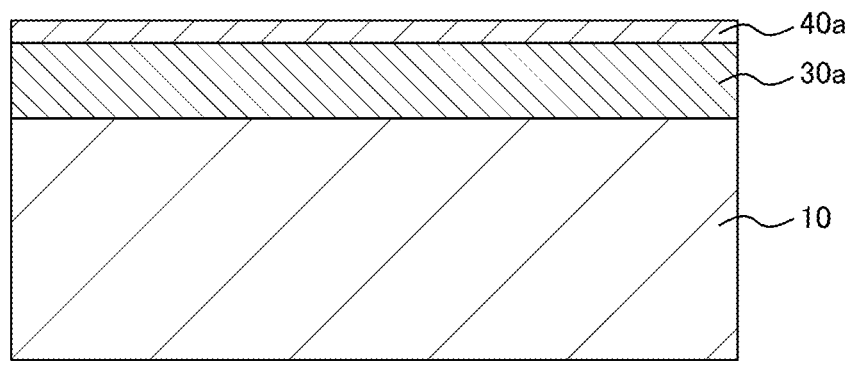
FIG. 8 is a diagram for describing a method of manufacturing a surface-treated steel sheet for battery containers according to a third embodiment.

As illustrated in FIG. 8, a surface-treated steel sheet for battery containers according to the third embodiment is manufactured in the same manner as the surface-treated steel sheet for battery containers according to the first embodiment illustrated in FIG. 1 and has the same configuration except that after an iron-nickel alloy plating layer 30a and a nickel plating layer 40a are formed on a steel sheet 10 in this order, a thermal treatment is performed on the steel sheet so that each layer is thermally diffused, and thus the iron-nickel alloy layer is manufactured as the outermost layer.

Here, the iron-nickel alloy plating layer 30a can be formed on the steel sheet 10 by plating under the same conditions as the iron-nickel alloy plating in the first embodiment described above. In addition, the nickel plating layer 40a can be formed on the steel sheet 10 by a known method using a watt bath, a sulfamate bath, or the like.

In this embodiment, after the iron-nickel alloy plating layer 30a and the nickel plating layer 40a are formed on the steel sheet 10, the thermal treatment is performed on the steel sheet 10 to form the iron-nickel alloy layer. At this time, however, the iron-nickel alloy plating layer 30a and the nickel plating layer 40a are sufficiently diffused, and thus the iron-nickel alloy layer is formed up to the outermost surface.

Conditions of the thermal treatment may be similar to those of the thermal treatment in the first embodiment described above without being particularly limited. However, the conditions are set such that the iron-nickel alloy plating layer 30a and the nickel plating layer 40a are completely diffused and thus the iron-nickel alloy layer is formed up to the outermost surface by appropriate adjustment of the thermal treatment temperature and the thermal treatment time.

In this embodiment, the thickness of the nickel plating layer 40a is preferably 1.0 µm or less and more preferably 0.5 µm or less before the thermal treatment is performed. When the thickness of the nickel plating layer 40a is set to be in the above range before the thermal treatment is performed, since the nickel plating layer 40a can be sufficiently diffused by the thermal treatment under a lower thermal treatment temperature or a shorter thermal treatment time, it is possible to prevent deterioration of the steel sheet 10 due to heat.

Furthermore, in this embodiment, the outermost surface of the iron-nickel alloy layer has an average crystal grain size similar to that of the iron-nickel alloy layer 20 of the surface-treated steel sheet 100 according to the first embodiment described above. A method of controlling the average crystal grain size at the outermost surface of the iron-nickel alloy layer is not particularly limited, but, for example, may include a method of performing the iron-nickel alloy plating or a method of performing the thermal treatment under the same conditions as in the first embodiment described above.

Moreover, in this embodiment, the iron-nickel alloy layer also has the same hardness as that of the iron-nickel alloy layer 20 of the surface-treated steel sheet 100 according to the first embodiment described above.

The thickness of the iron-nickel alloy layer is not particularly limited. In addition, the thickness of the iron-nickel alloy plating layer 30a before the thermal treatment is not particularly limited, but is preferably 0.5 to 2.0 µm and more preferably 0.5 to 1.5 µm. When the thickness of the iron-nickel alloy plating layer 30a before the thermal treatment is set to be within the above range, it is possible to further improve liquid leakage resistance and battery characteristics of the battery container in a case where the resulting surface-treated steel sheet for battery containers is used for the battery container.

In this embodiment, after the iron-nickel alloy plating layer 30a and the nickel plating layer 40a are formed on the steel sheet 10, the thermal diffusion is performed, and the outermost surface of the formed iron-nickel alloy layer has the same average crystal grain size as that of the first embodiment described above. Thus, the following effects are exhibited. That is, first, when the resulting surface-treated steel sheet for battery containers is used for the battery container, liquid leakage resistance and battery characteristics can be improved as in the surface-treated steel sheet 100 according to the first embodiment described above.

In addition, the surface-treated steel sheet for battery containers of this embodiment is configured such that the ratio of Ni atoms contained in the iron-nickel alloy layer is highest in the vicinity of the outermost surface and gradually lowers as being closer to the steel sheet 10. Thus, it is possible to more effectively suppress the elution of iron in the steel sheet 10. Specifically, first, when the surface-treated steel sheet for battery containers of this embodiment is used for the battery container, the content ratio of Ni atoms is high at the outermost surface of the iron-nickel alloy layer, and thus the elution of iron can be effectively suppressed. Moreover, even when deep cracks occur inside the battery container and the steel sheet 10 is exposed at the time of forming as the battery container, the content ratio of Ni atoms is low at a side closer to the steel sheet 10 with respect to the iron-nickel alloy layer, and thus it is possible to make the difference in the standard electrode potential of the steel sheet 10 and the iron-nickel alloy layer located in the vicinity of the steel sheet 10 small. Whereby, it is possible to more effectively suppress the elution of iron in the steel sheet 10 as compared with the configuration in which the nickel plating layer 40 remains as in the surface-treated steel sheet 100a illustrated in FIG. 6 described above.

An example of a method of measuring the content ratio of Ni atoms in the surface-treated steel sheet for battery containers may include a method of measuring the transition of Ni intensity toward the steel sheet 10 from the iron-nickel alloy layer, which is the outermost surface, using the high-frequency glow discharge optical emission spectrometer.

Embodiments of the invention have heretofore been described. These embodiments are described to facilitate understanding of the invention and are not described to limit the invention. It is therefore intended that the elements disclosed in the above embodiments include all design modifications and equivalents to fall within the technical scope of the invention.

EXAMPLE

The invention will be described below in detail with reference to Examples, but the invention is not limited to these Examples.

Evaluation methods of each of characteristics are as follows.

<Measurement of Average Crystal Grain Size>

When the surface-treated steel sheet for battery containers is irradiated with electron beams using a scanning electron microscope (SEM), one crystal grain is considered as a region having a difference of 2° or less in reflection angle between adjacent irradiation points obtained by analysis of an electron backscatter diffraction (EBSD) pattern which is obtained by projecting electron beams reflected from the surface of the surface-treated steel sheet for battery containers onto a screen, whereby the crystal grain size is calculated for each crystal grain. The calculated crystal grain sizes were averaged, so that the average crystal grain size was obtained at the outermost surface of the surface-treated steel sheet for battery containers.

<Measurement the Content Ratio of Fe Atoms in the Outermost Layer after the Thermal Treatment>

The surface of the surface-treated steel sheet for battery containers was measured using a field emission Auger microprobe (model number: JAMP-9500F manufactured by JEOL Ltd.), whereby the content ratio (atomic %) of Fe atoms was obtained.

<Measurement of Surface Hardness>

With respect to the surface-treated steel sheet for battery containers, Vickers hardness (HV) was measured by a micro hardness tester (model number: MVK-G2 manufactured by Akashi Co.) using a diamond indenter under conditions of a load: 10 gf and a holding time: 10 seconds, and thus the surface hardness was measured.

<Evaluation of Battery Characteristics>

After an alkaline manganese battery produced using the surface-treated steel sheet for battery containers was held at an environment of a temperature of 80° C. for three days, and a current meter was connected to the battery, thereby providing a closed circuit. At this time, a current (short circuit current) flowing between both terminals was measured, and the battery characteristics were evaluated under the following criteria based on the obtained current value.

A: short circuit current was 9 A or more
B: short circuit current was 8 A or more but less than 9 A
C: short circuit current was 7 A or more but less than 8 A
D: short circuit current was less than 7 A In evaluation results of the battery characteristics, a surface-treated steel sheet for battery containers having a short circuit current of 9 A or more (evaluation A) was excellent in battery characteristics and thus was determined to be acceptable, whereas a surface-treated steel sheet for battery containers having a short circuit current of less than 9 A (evaluations B to D) was inferior in battery characteristics when being used for the battery container and thus was determined to be unacceptable.

<Evaluation of the Amount of Gas to be Generated>

First, an external load having an electric resistance value of 3.9Ω was connected to the alkaline manganese battery produced using the surface-treated steel sheet for battery containers to repeatedly perform a discharge operation of one hour a day for several days, and thus a voltage of the alkaline manganese battery was reduced to 0.4 V. Thereafter, the alkaline manganese battery was held at a temperature environment of 60° C. for 20 days and was thus destroyed in water. At this time, the amount of generated gas in the water was measured. Measurement results were evaluated by the following criteria.

A: amount of generated gas was less than 2 cc
B: amount of generated gas was 2 cc or more but less than 2.5 cc
C: amount of generated gas was 2.5 cc or more but less than 3 cc
D: amount of generated gas was 3 cc or more In evaluation results of the amount of gas to be generated, a surface-treated steel sheet for battery containers having the amount of generated gas of less than 3 cc (evaluations A and B) was extended in service life of the battery when being used for the battery container and was determined to be acceptable. Whereas a surface-treated steel sheet for battery containers having the amount of generated gas of 2.5 cc or more (evaluations C and D) was shortened in service life of the battery when being used for the battery container and was determined to be unacceptable.

Example 1

As a base substance, there was prepared a steel sheet obtained by annealing a cold-rolled sheet (thickness of 0.25 mm) of low-carbon aluminum-killed steel having a chemical composition as below:

C: 0.045 wt %, Mn: 0.23 wt %, Si: 0.02 wt %, P: 0.012 wt %, S: 0.009 wt %, Al: 0.063 wt %, and the balance: Fe and inevitable impurities Then, after the prepared steel sheet was subjected to alkaline electrolytic degreasing and acid cleaning through sulfuric acid immersion, electroplating was conducted under the following conditions, whereby an iron-nickel alloy plating layer with a thickness of 2 μm was formed. The following bath composition has been adjusted such that the composition of the formed iron-nickel alloy plating layer has the content ratio of Fe atoms being 15 atomic % and the content ratio of Ni atoms being 85%. In Example 1, as a plating layer, only the iron-nickel alloy plating layer was formed as an upper plating layer.

Bath composition: nickel sulfate of 240 g/L, nickel chloride of 45 g/L, iron sulfate of 10 g/L, and boric acid of 30 g/L pH: 3.0

Bath temperature: 60° C.

Current density: 10 A/dm$^2$

Subsequently, for the steel sheet formed with the iron-nickel alloy plating layer, continuous annealing was carried out to perform a thermal treatment under the conditions of a temperature of 700° C. for one minute and a reducing atmosphere, whereby iron-nickel alloy plating layer was thermally diffused and the iron-nickel alloy layer was formed. Consequently, the surface-treated steel sheet for battery containers having the configuration illustrated in FIG. 1 was obtained.

Thereafter, for the surface-treated steel sheet for battery containers obtained in such a manner, measurement of the average crystal grain size, measurement of the content ratio of Fe atoms at the outermost layer after the thermal treatment, and measurement of the surface hardness were performed in accordance with the above-described methods. Results are listed in Table 1.

Moreover, the surface-treated steel sheet for battery containers obtained in the above manner was punched to a blank diameter of 57 mm, and was formed into an LR6-type battery (AA-type battery) container having a cylindrical shape of an outer diameter of 13.8 mm and a height of 49.3 mm through a multistage drawing process and further re-drawing forming such that the iron-nickel alloy layer would be located at the inner surface side of the battery container, and the battery container was thus manufactured.

Subsequently, the obtained battery container was used to prepare an alkaline manganese battery as below. That is, a positive electrode mixture was prepared by sampling manganese dioxide and graphite with a ratio of 10:1, adding potassium hydroxide (10 mol/L) to the manganese dioxide and graphite, and mixing them. Next, this positive electrode mixture was pressurized in a mold to form a doughnut-shaped positive electrode mixture pellet having a predetermined size, and the mixture pellet was pressed and inserted into the battery container obtained as described above. Next, a separator formed of vinylon fabric cloth was inserted into the positive electrode mixture pellet, which was pressed and inserted in the battery container, so as to be located along the inner periphery of the positive electrode mixture pellet, and the battery container was filled with a negative electrode gel comprising zinc particles and potassium hydroxide saturated with zinc oxide. After attaching an insulator gasket to the negative electrode plate to which the negative electrode current collector rod is spot welded and inserting them into the battery container, caulking was performed to complete the alkaline manganese battery.

Then, with respect to the alkaline manganese battery obtained in this manner, evaluation of battery characteristics and evaluation of the amount of gas to be generated were performed. Results are listed in Table 1.

Examples 2 to 5

A surface-treated steel sheet for battery containers and an alkaline manganese battery were prepared in the same manner as in Example 1 except that plating conditions were changed such that an iron-nickel alloy plating layer (upper plating layer) formed by electroplating had compositions indicated in Table 1, and evaluations were conducted in the same manner as in Example 1. Results are listed in Table 1.

Comparative Examples 1 and 2

A surface-treated steel sheet for battery containers and an alkaline manganese battery were prepared in the same manner as in Example 1 except that plating conditions were changed such that an iron-nickel alloy plating layer (upper plating layer) formed by electroplating had compositions indicated in Table 1, and evaluations were conducted in the same manner as in Example 1. Results are listed in Table 1.

Comparative Example 3

A surface-treated steel sheet for battery containers and an alkaline manganese battery were prepared in the same manner as in Example 1 except that a nickel plating layer having a thickness of 2 μm was formed by electroplating under the following conditions instead of the above-described iron-nickel alloy plating layer as the upper plating layer, and evaluations were conducted in the same manner as in Example 1. Results are listed in Table 1.

Bath composition: nickel sulfate of 250 g/L, nickel chloride of 45 g/L, and boric acid of 30 g/L pH: 4.2

Bath temperature: 60° C.

Current density: 10 A/dm$^2$

Comparative Examples 4 and 5

A surface-treated steel sheet for battery containers and an alkaline manganese battery were prepared in the same manner as in Comparative Example 3 except that a thickness of a nickel plating layer (upper plating layer) formed by electroplating was set as indicated in Table 1 and batch-type annealing was performed under conditions indicated in Table 1 instead of the thermal treatment by the above-described continuous annealing, and evaluations were conducted in the same manner as in Comparative Example 3. Results are listed in Table 1.

TABLE 1

| | Configuration of plating layer before thermal treatment | | | | | | Conditions of thermal treatment | | Average crystal grain size [μm] | Content ratio of Fe atoms at outermost layer after thermal treatment [at %] | Surface hardness [HV] | Battery characteristics* | Amount of gas to be generated** |
|---|---|---|---|---|---|---|---|---|---|---|---|---|---|
| | Upper plating layer | | | Lower plating layer | | | Thermal treatment temperature × time | Annealing method | | | | | |
| | Fe [at %] | Ni [at %] | Thickness [μm] | Fe [at %] | Ni [at %] | Thickness [μm] | | | | | | | |
| Example 1 | 15 | 85 | 2 | None | | | 700° C. 1 min. | Continuous annealing | 8 | 15 | 220 | A | A |
| Example 2 | 20 | 80 | 2 | None | | | 700° C. 1 min. | Continuous annealing | 6 | 25 | 230 | A | A |
| Example 3 | 30 | 70 | 2 | None | | | 700° C. 1 min. | Continuous annealing | 2 | 32 | 238 | A | A |
| Example 4 | 40 | 60 | 2 | None | | | 700° C. 1 min. | Continuous annealing | 1.5 | 44 | 245 | A | B |
| Example 5 | 45 | 55 | 2 | None | | | 700° C. 1 min. | Continuous annealing | 1 | 45 | 250 | A | B |
| Comparative Example 1 | 10 | 90 | 2 | None | | | 700° C. 1 min. | Continuous annealing | 10 | 10 | 215 | B | A |
| Comparative Example 2 | 50 | 50 | 2 | None | | | 700° C. 1 min. | Continuous annealing | 0.5 | 54 | 264 | A | C |
| Comparative Example 3 | 0 | 100 | 2 | None | | | 700° C. 1 min. | Continuous annealing | 15 | 0 | 199 | D | A |
| Comparative Example 4 | 0 | 100 | 0.5 | None | | | 650° C. 2 h | Batch-type annealing | 10 | 31 | 275 | C | C |
| Comparative Example 5 | 0 | 100 | 1 | None | | | 650° C. 2 h | Batch-type annealing | 11 | 30 | 245 | B | B |

*A being defined to be acceptable.
**A and B being defined to be acceptable.

Example 6

A surface-treated steel sheet for battery containers and an alkaline manganese battery were prepared in the same manner as in Example 1 except that after a nickel plating layer (lower plating layer) having a thickness of 8 μm was previously formed on a steel sheet under the following conditions, an iron-nickel alloy plating layer (upper plating layer) was formed on the nickel plating layer by electroplating, and a surface-treated steel sheet for battery containers of the configuration in which the nickel plating layer does not remain as illustrated in FIG. 3 was prepared by change of plating conditions such that the composition and thickness of the iron-nickel alloy plating layer to be formed were set as indicated in Table 2. Evaluations were conducted in the same manner as in Example 1, and results are listed in Table 2. In Example 6, as a plating layer, the iron-nickel alloy plating layer was formed as an upper plating layer, and the nickel plating layer was formed as a lower plating layer.

Bath composition: nickel sulfate of 250 g/L, nickel chloride of 45 g/L, and boric acid of 30 g/L
pH: 4.2
Bath temperature: 60° C.
Current density: 10 A/dm$^2$ Example 7

A surface-treated steel sheet for battery containers and an alkaline manganese battery of the configuration illustrated in FIG. 3 were prepared in the same manner as in Example 6 except that plating conditions were changed such that an iron-nickel alloy plating layer (upper plating layer) formed by electroplating had compositions indicated in Table 2, and evaluations were conducted in the same manner as in Example 6. Results are listed in Table 2.

In Examples 6 and 7, remaining confirmation of the nickel plating layer was not performed by the above-described high-frequency glow discharge optical emission spectrometer. However, since the thickness of the nickel plating layer formed as a lower plating layer was relatively thin, it was considered that the resulting surface-treated steel sheet for battery containers had the configuration in which the nickel plating layer did not remain as illustrated in FIG. 3.

Here, the above-described graph illustrated in FIG. 5 illustrates measurement results of Fe intensity and Ni intensity with respect to the surface-treated steel sheet for battery containers obtained in the same manner as in Example 6 except that the thickness of the lower plating layer was set to be 1.0 μm and the thickness of the upper plating layer was set to be 1.0 μm, using the high-frequency glow discharge optical emission spectrometer. In the graph illustrated in this FIG. 5, as described above, a region does not remain in which the Fe intensity is less than 1/10 of the maximum value, and it can be judged that the nickel plating layer does not remain in the surface-treated steel sheet for battery containers. Therefore, since the nickel plating layer is further easily diffused in Examples 6 and 7 in which the thickness of the lower plating layer is as thin as 0.8 μm compared with the surface-treated steel sheet for battery containers in the graph of FIG. 5, it is considered to have the surface-treated steel sheet for battery containers in which the nickel plating layer does not remain as illustrated in FIG. 3.

Examples 8 and 9

A surface-treated steel sheet for battery containers and an alkaline manganese battery were prepared in the same manner as in Example 6 except that each of plating conditions was changed such that the thickness of a nickel plating layer (lower plating layer) formed on a steel sheet was set as indicated in Table 2 and the composition and thickness of an iron-nickel alloy plating layer (upper plating layer) formed on the nickel plating layer were set as indicated in Table 2, thereby preparing a surface-treated steel sheet for battery containers of the configuration in which the nickel plating layer remained as illustrated in FIG. 6. Evaluations were conducted in the same manner as in Example 6, and results are listed in Table 2.

Furthermore, in Examples 8 and 9, remaining confirmation of nickel plating layer was actually evaluated by the following method with respect to the surface-treated steel sheet for battery containers. That is, it is determined that the nickel plating layer remains in a case where a region exists in which the Fe intensity is less than 1/10 of the maximum value of the Fe intensity when the transition of Ni intensity and Fe intensity is measured using a high-frequency glow discharge optical emission spectrometer (Model number: GDS-3860 manufactured by Rigaku Corporation) in a thickness direction toward the steel sheet from the iron-nickel alloy layer at the outermost surface, and it is determined and evaluated that the nickel plating layer does not remain in a case where a region does not exist in which the Fe intensity is less than 1/10 of the maximum value. Results of Example 8 are illustrated in FIG. 9(A), and results of Example 9 are illustrated in FIG. 9(B), respectively.

Figure 9A:
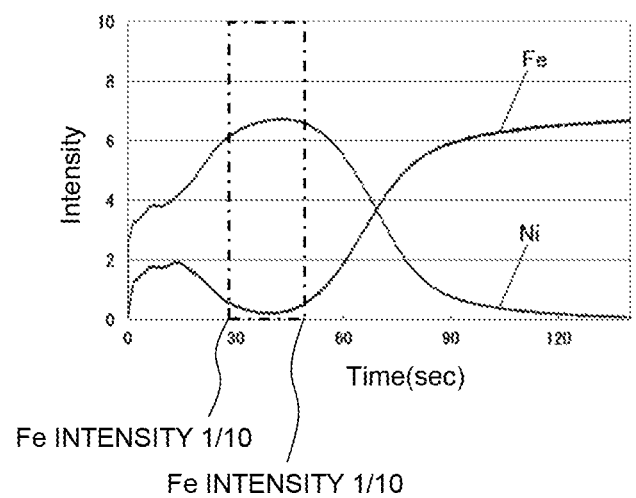
FIGS. 9A and 9B are diagrams illustrating results obtained by measuring Ni intensity and Fe intensity with respect to surface-treated steel sheets for battery containers according to Examples, using a high-frequency glow discharge optical emission spectrometer.
Figure 9B:
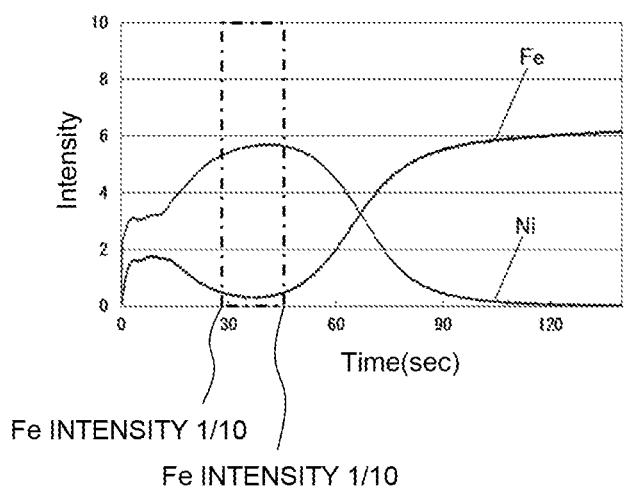

In FIGS. 9(A) and 9(B), the Fe intensity is less than 1/10 of the maximum value in a region indicated by a chain line, it can be confirmed that nickel remains alone. Thus, it was confirmed that the surface-treated steel sheets for battery containers in Examples 8 and 9 had a configuration in which the nickel plating layer remained as illustrated in FIG. 6.

Example 10

A surface-treated steel sheet for battery containers and an alkaline manganese battery were prepared in the same manner as in Example 1 except that after an iron-nickel alloy plating layer was formed on a steel sheet such that an iron-nickel alloy plating layer (lower plating layer) formed by electroplating had the composition and thickness as indicated in Table 3, and a nickel plating layer (upper plating layer) having a thickness of 0.1 μm was further formed on the iron-nickel alloy plating layer and was subjected to a thermal treatment to thermally diffuse the iron-nickel alloy plating layer and the nickel plating layer, whereby the iron-nickel alloy layer was formed and the surface-treated steel sheet for battery containers of the configuration illustrated in FIG. 1 was prepared. Evaluations were conducted in the same manner as in Example 1, and results were listed in Table 3. In Example 10, as a plating layer, the nickel plating layer was formed as an upper plating layer, and the iron-nickel alloy plating layer was formed as a lower plating layer.

Example 11

A surface-treated steel sheet for battery containers and an alkaline manganese battery were prepared in the same manner as in Example 10 except that plating conditions were changed such that an iron-nickel alloy plating layer (lower plating layer) formed by electroplating had compositions indicated in Table 3, and evaluations were conducted in the same manner as in Example 10. Results are listed in Table 3.

Comparative Example 6

A surface-treated steel sheet for battery containers and an alkaline manganese battery were prepared in the same manner as in Comparative Example 3 except that a nickel

TABLE 2

| | Configuration of plating layer before thermal treatment | | | | | | Conditions of thermal treatment | | Average crystal grain size [μm] | Content ratio of Fe atoms at outermost layer after thermal treatment [at %] | Surface hardness [HV] | Battery characteristics* | Amount of gas to be generated** |
|---|---|---|---|---|---|---|---|---|---|---|---|---|---|
| | Upper plating layer | | | Lower plating layer | | | Thermal treatment | | | | | | |
| | Fe [at %] | Ni [at %] | Thickness [μm] | Fe [at %] | Ni [at %] | Thickness [μm] | temperature × time | Annealing method | | | | | |
| Example 6 | 30 | 70 | 0.2 | 0 | 100 | 0.8 | 700° C. 1 min. | Continuous annealing | 4 | 20 | 212 | A | A |
| Example 7 | 50 | 50 | 0.2 | 0 | 100 | 0.8 | 700° C. 1 min. | Continuous annealing | 3 | 38 | 214 | A | A |
| Example 8 | 30 | 70 | 0.5 | 0 | 100 | 1.5 | 700° C. 1 min. | Continuous annealing | 3 | 25 | 219 | A | A |
| Example 9 | 50 | 50 | 0.5 | 0 | 100 | 1.5 | 700° C. 1 min. | Continuous annealing | 1 | 46 | 235 | A | B |

*A being defined to be acceptable.
**A and B being defined to be acceptable.

plating layer (upper plating layer) formed at the outermost layer had a thickness indicated in Table 3, and evaluations were conducted in the same manner as Comparative Example 3. Results were listed in Table 3.

Comparative Example 7

A surface-treated steel sheet for battery containers and an alkaline manganese battery were prepared in the same manner as in Example 10 except that an iron-nickel alloy plating layer (lower plating layer) formed by electroplating had compositions indicated in Table 3, and evaluations were conducted in the same manner as Example 10. Results were listed in Table 3.

the service life of the battery was short as a result in all of Comparative Examples 2, 4 and 7 in which the average crystal grain size was less than 1 μm or exceeded 8 μm at the outermost surface of the iron-nickel alloy layer.

DESCRIPTION OF REFERENCE NUMERALS 100, 100a, 100b: surface-treated steel sheet
10: steel sheet
20, 20a: iron-nickel alloy layer
30, 30a: iron-nickel alloy plating layer
40, 40a: nickel plating layer
50: iron-nickel diffusion layer

TABLE 3

| | Configuration of plating layer | | | | | | Conditions of thermal treatment | | | Content ratio of Fe atoms at outermost layer | | | |
|---|---|---|---|---|---|---|---|---|---|---|---|---|---|
| | before thermal treatment | | | | | | Thermal treatment | | Average crystal grain size [μm] | after thermal treatment [at %] | Surface hardness [HV] | Battery characteristics* | Amount of gas to be generated** |
| | Upper plating layer | | | Lower plating layer | | | | | | | | | |
| | Fe [at %] | Ni [at %] | Thickness [μm] | Fe [at %] | Ni [at %] | Thickness [μm] | temperature × time | Annealing method | | | | | |
| Example 10 | 0 | 100 | 0.1 | 30 | 70 | 0.9 | 700° C. 1 min. | Continuous annealing | 3 | 27 | 222 | A | A |
| Example 11 | 0 | 100 | 0.1 | 50 | 50 | 0.9 | 700° C. 1 min. | Continuous annealing | 1 | 48 | 248 | A | A |
| Comparative Example 6 | 0 | 100 | 1.0 | | None | | 700° C. 1 min. | Continuous annealing | 14 | 0 | 195 | C | B |
| Comparative Example 7 | 0 | 100 | 0.1 | 70 | 30 | 0.9 | 700° C. 1 min. | Continuous annealing | 0.4 | 60 | 266 | B | C |

*A being defined to be acceptable.
**A and B being defined to be acceptable.

As indicated in Tables 1 to 3, the evaluation results were good in terms of battery characteristics and the battery characteristics such as discharge characteristics were excellent as a result in all of Examples 1 to 11 in which the average crystal grain size was 1 to 8 μm at the outermost surface of the iron-nickel alloy layer. Moreover, the evaluation results were good in terms of the amount of gas to be generated and the service life of the battery was long as a result in all of Examples 1 to 11.

In contrast, as indicated in Tables 1 and 3, the evaluation results were poor in terms of battery characteristics and the battery characteristics such as discharge characteristics were inferior as a result in all of Comparative Examples 1 and 3 to 7 in which the average crystal grain size was less than 1 μm or exceeded 8 μm at the outermost surface of the iron-nickel alloy layer. In addition, the evaluation results were poor in terms of the amount of gas to be generated and

The invention claimed is:

1. A surface-treated steel sheet for battery containers obtained in such a manner that after iron-nickel alloy plating is performed on a steel sheet, a thermal treatment is performed,
    wherein an outermost layer is an iron-nickel alloy layer,
    wherein the iron-nickel alloy layer has an average crystal size of 1 to 8 μm at the outermost surface thereof,
    wherein a content ratio of Fe atoms is 12 to 50 atomic % at the outermost surface of the iron-nickel alloy layer, and
    wherein the iron-nickel alloy layer has Vickers hardness (HV) of 210 to 250.

2. A battery container obtained by forming the surface-treated steel sheet according to claim 1.

3. A battery obtained using the battery container according to claim 2.

* * * * *